Figure 1:
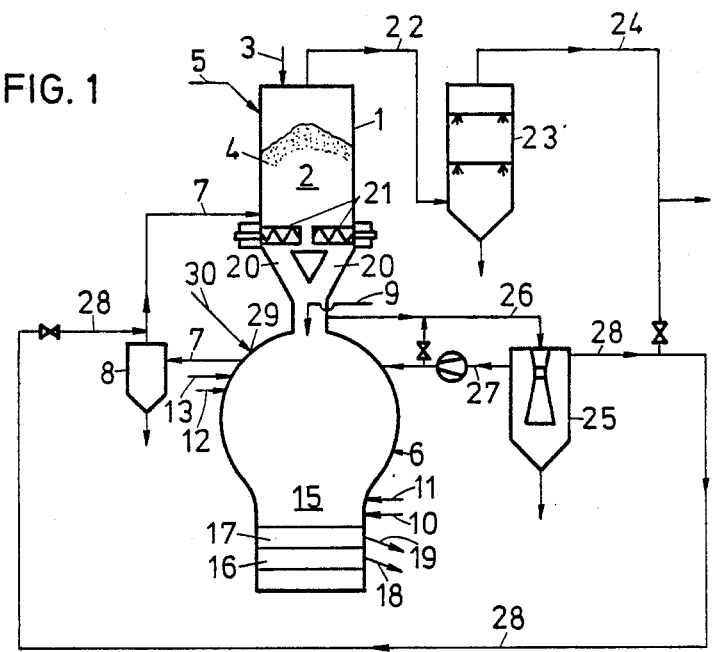

United States Patent [19]

Sulzbacher et al.

[11] Patent Number: 4,895,593
[45] Date of Patent: Jan. 23, 1990

[54] PROCESS OF RECOVERING MOLTEN PIG IRON OR STEEL PRE-PRODUCTS FROM LUMPY IRON-OXIDE AND SCRAP USING A FLUIDIZED BED

[75] Inventors: Horst Sulzbacher, Leoben, Austria; Markus Hubig, Aachen, Fed. Rep. of Germany

[73] Assignee: Korf Engineering GmbH, Dusseldorf, Fed. Rep. of Germany

[21] Appl. No.: 221,876

[22] Filed: Jul. 20, 1988

[30] Foreign Application Priority Data

Jul. 30, 1987 [AT] Austria .................................. 1933/87

[51] Int. Cl.$^4$ .............................................. C22B 1/10
[52] U.S. Cl. .......................................... 75/26; 75/38; 75/43; 75/44 S; 75/58; 75/40
[58] Field of Search ............... 75/26, 38, 40, 43, 44 R, 75/44 S, 58; 266/160

[56] References Cited

U.S. PATENT DOCUMENTS

| | | | |
|---|---|---|---|
| 4,007,034 | 2/1977 | Hartwig et al. | 75/36 |
| 4,111,687 | 9/1978 | Syska | 75/38 |
| 4,317,677 | 3/1982 | Weber et al. | 75/43 |
| 4,566,902 | 1/1986 | Sulzbacher et al. | 75/43 |

FOREIGN PATENT DOCUMENTS 0010627 9/1979 European Pat. Off. .
2819465 11/1979 Fed. Rep. of Germany .

*Primary Examiner*—Melvyn J. Andrews
*Attorney, Agent, or Firm*—Ostrolenk, Faber, Gerb & Soffen

[57] ABSTRACT

This is disclosed a process of recovering molten pig iron or steel pre-products from lumpy iron-oxide containing charging substances. The charging substances are reduced to sponge iron in a direct reduction zone, the sponge iron is smelted in a meltdown gasifying zone under supply of carbon carriers and oxygen-containing gas forming a coal fluidized bed, and CO and $H_2$ containing reduction gas is produced, which is injected into the direct reduction zone and reacted there. For the commercial utilization of low-quality scrap grades, such as, e.g., automotive scrap, (a) scrap is charged into the meltdown gasifying zone in addition to sponge iron,
(b) the scrap has an apparent weight of between 300 and 1000 kg/m$^3$, preferably between 400 and 600 kg/m$^3$, and
(c) the temperature of the coal fluidized bed is maintained at 1,500° to 1,700° C., The scrap passes the coal fluidized bed, is carbonized and is smelted by maintaining reducing conditions, and possibly present organic impurities are pyrolyzed.

14 Claims, 2 Drawing Sheets

PROCESS OF RECOVERING MOLTEN PIG IRON OR STEEL PRE-PRODUCTS FROM LUMPY IRON-OXIDE AND SCRAP USING A FLUIDIZED BED

The invention relates to a process of recovering molten pig iron or steel pre-products from lumpy iron-oxide containing charging substances by reducing the charging substances to sponge iron in a direct reduction zone, smelting the sponge iron in a meltdown gasifying zone under supply of carbon carriers and oxygen-containing gas forming a coal fluidized bed, and by producing a CO and $H_2$ containing reduction gas to be injected into the direct reduction zone and reacted there, as well as to a plant for carrying out the process.

A process of this type is known, for instance, from EP-A1-0 010 627, in which a fluidized bed is formed from lumpy carbon carriers in the meltdown gasifying zone by blowing in oxygen-containing gas. In the fluidized bed the sponge iron particles formed in the direct reduction zone and top-fed into the meltdown gasifying zone are braked and smelted. In the direct reduction zone a large amount of top gas is incurred, which has a considerable content of carbon monoxide and hydrogen. If this top gas can be commercially utilized, the production costs for pig iron and steel pre-products will be very low.

A problem to be faced by the steel industry is the utilization of scrap incurred from dismounted or destroyed objects and gadgets already out of use, such as consumer scrap.

Consumer scrap, in particular, automotive scrap, is characterized by a high portion of organic impurities and non-ferrous metallic accompanying elements and, therefore, is to be processed at great expenditures only. At present, scrap usually is smelted in electric arc furnaces, cupola furnaces and blast furnaces and in oxygen converters. However, for low-quality consumer scrap only cupola and blast furnaces are suited. Yet, any organic admixtures must be removed in a cumbersome way prior to utilization, and the unavoidable introduction of metals and compounds having lower melting points than iron must be minimized as far as possible, because either they will become enriched in the blast furnace, thus causing the destruction of the brickwork, or they will be discharged together with the exhaust gas.

A process and an arrangement for producing crude metal as a burden for the steel industry is described by DE-A-28 19 465. Iron ore and, if desired, even wrought iron scrap and steel scrap serve as starting materials. The utilization of low-quality consumer scrap is not mentioned at all.

The invention has as its object to provide a process and an arrangement for utilizing scrap, by which it is possible, in particular, to supply heavily contaminated scrap, such as, e.g., consumer scrap, to re-utilization in an economic way.

The basic idea of the invention resides in applying the direct reduction and meltdown gasifying processes defined in the introductory part of this specification to scrap utilization, the invention being characterized in that (a) scrap is charged into the meltdown gasifying zone in addition to sponge iron, (b) the scrap has an apparent weight of between 300 and 1000 kg/m$^3$, preferably between 400 and 600 kg/m$^3$, and (c) the temperature of the coal fluidized bed is maintained at 1500° to 1700° C., wherein the scrap passes the coal fluidized bed, is carbonized and is smelted by maintaining reducing conditions, and possibly present organic impurities are pyrolyzed.

The apparent weight of the scrap of preferably 400 to 600 kg/m$^3$ is oriented at the apparent weight of the coal fluidized bed and enables the slow descent of the scrap pieces in the coal fluidized bed. Thereby, it is ensured that sufficient time will be available for carbonizing and overheating the scrap.

The scrap melts in dependence on the temperature of the fluidized bed (1,500° to 1,700° C.) as well as on the size of the pieces and on the weight, collecting on the bottom of the meltdown gasifier together with slag. Due to the iron contacting the coal bed, carbonization and, thus, a decrease in the liquidus temperature of the metal occur. Moreover, the height of the fluidized bed temperature may be controlled via the quality of the fuel and the supply rate of the scrap.

A fluidized bed temperature of 1,500° to 1,700° C. enables the complete decomposition of possibly present organic impurities.

Preferably, the scrap is processed into lumps or into bundles prior to charging, thus enabling the adjustment of its apparent weight.

Advantageously, the scrap is mixed with combustible matter of refuse prior to processing. Thus, refuse may be used as fuel, which otherwise would not reach the coal fluidized bed on account of its low specific weight, but would be discharged together with the reduction gas. A particular advantage of this variant is the saving of higher-quality fuels.

Low-quality scrap with a high portion of organic impurities, such as greases, oils, textiles or synthetics, preferably is charged directly into the meltdown gasifying zone without preheating. Thereby, the formation of low temperature carbonization gas and of low temperature carbonization coke is avoided, because the scrap immediately is brought to the high temperature of the coal fluidized bed in the meltdown gasifier and the organic impurities are completely pyrolyzed to hydrogen, carbon monoxide and carbon. This direct use of low-quality scrap grades, which does not involve any problems, enables the commercial utilization of scrap, as the costs for purification and sorting have been dropped. Add to this that the pyrolysis gases promote the reduction conditions, and this allowance in gas further increases the economy of the process.

An advantageous variant of the process consists in that small-size scrap poor in organic impurities is preheated prior to charging into the meltdown gasifying zone, in particular by being fed into the direct reduction zone commonly with iron-oxide containing charging substances. By preheating the scrap, both the fuel charge into the meltdown gasifier is reduced and the smelting rate is increased.

In addition to organochemical impurities, scrap still may contain non-ferrous metallic accompanying elements, such as Hg, Cd, Pb, Cu, Ni or Cr. During the production of steel, these elements, as a rule, cannot be removed at all or only to a slight extent, thus impairing the quality of the steel. Owing to the high temperature prevailing in the coal fluidized bed, a portion of these elements is evaporated, merging into the reduction gas.

Advantageously, enrichment of these elements in the reduction gas is avoided by branching at least a partial flow of the reduction gas off the meltdown gasifying zone and returning it into the meltdown gasifying zone and/or direct reduction zone upon scrubbing. Thus, the further use of excess reduction gas is guaranteed without great expenditures.

According to a preferred variant, the feeding of oxygen-containing gas into the meltdown gasifying zone temporarily is reduced to interrupted, the supply of scrap being increased. Owing to this measure, the concentration of the accompanying metals in the reduction gas is elevated and a more efficient separation thereof at scrubbing is rendered possible.

Among the substances that are harmful to steel, tin and copper usually entail great difficulties, because they decisively affect the quality of the steel already at a portion of few hundredths percent. With the process according to the invention, tin advantageously is removed by means of calcium. When using tin-containing scrap, metallic calcium, therefore, is added to the molten metal, either as such or dissolved in a calcium halide slag.

So far, no suitable reaction partner has been known to completely remove copper. It has proved favorable if sodium sulfide or sodium sulfate slags are added to the molten metal in case copper-containing scrap is charged.

Scrap contaminated with synthetics frequently contains PVC, which offers the broadest spectrum of use among all the mass synthetics. Since it consists of chlorine to about 60%, it must be regarded as a problem substance at thermal processing. The chlorine bound in the synthetic material is released as a gas under the reaction conditions of scrap smelting. In order to prevent it from being discharged together with the reduction gas, fine lime is suitably added, which binds chlorine under the formation of calcium chloride.

A plant for carrying out the process, comprising
  a direct reduction shaft furnace including a charging substance supply duct for lumpy iron ore, a supply duct for reduction gas as well as a discharge duct for the reduction product formed in it and a discharge duct for top gas, and
  a meltdown gasifier, into which a duct for supplying the reduction product from the shaft furnace enters, and which includes supply ducts for oxygen-containing gases and carbon carriers as well as a discharge duct for reduction gas formed entering into the shaft furnace, and tap holes for pig iron and slag,
is characterized by a scrap charging means.

Advantageously, the scrap charging means comprises a conveying means leading from a gas-tightly sealable scrap hopper to a portioning means, wherein a gas-tight stopper means is provided between the conveying means and the scrap charging opening.

Suitably, the portioning means is designed as a cellular wheel sluice.

Advantageously, a scrap charging opening is provided in the cupola of the meltdown gasifier approximately in its axis. According to a further favorable variant, a scrap charging opening is provided on the upper end of the shaft furnace.

According to a particularly suitable variant, a reduction gas duct leads from the meltdown gasifier to a scrubber, from which a pure-gas discharge duct is connectable to the supply duct for the reduction gas or to the discharge duct for the top gas. By scrubbing, the substances harmful to steel, which have been carried away with the reduction gas, such as Zn, Pb or Cd, can be efficiently separated, thus considerably facilitating the further use of the reduction gas. Besides, slurry rich in valuable substances may be recovered in the scrubber.

Figure 2:
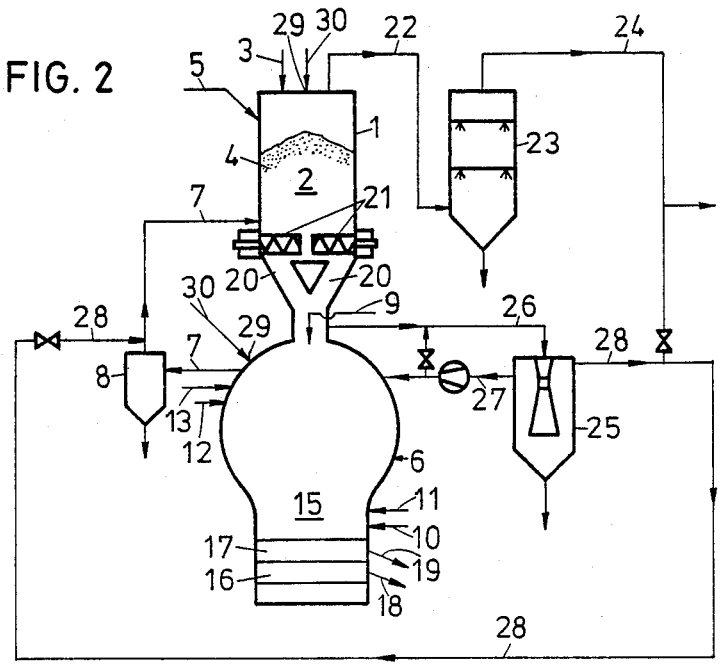
Figure 3:
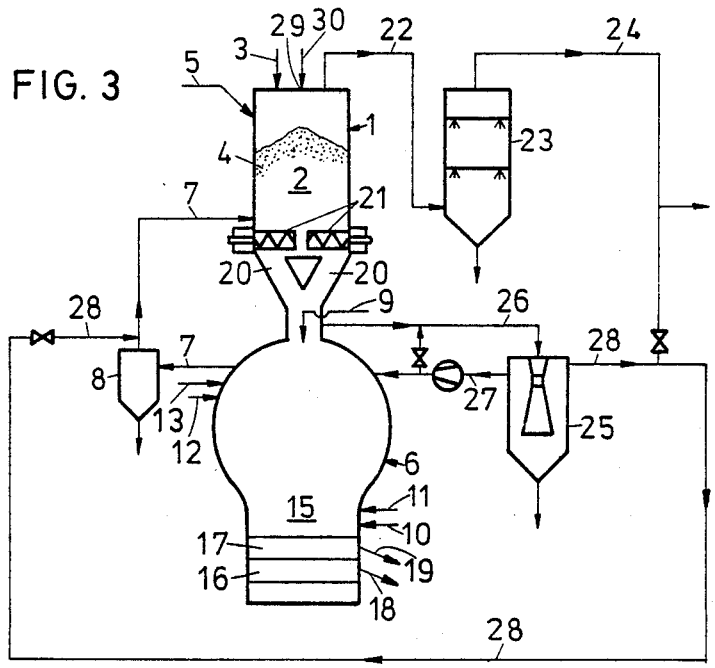
Figure 4:
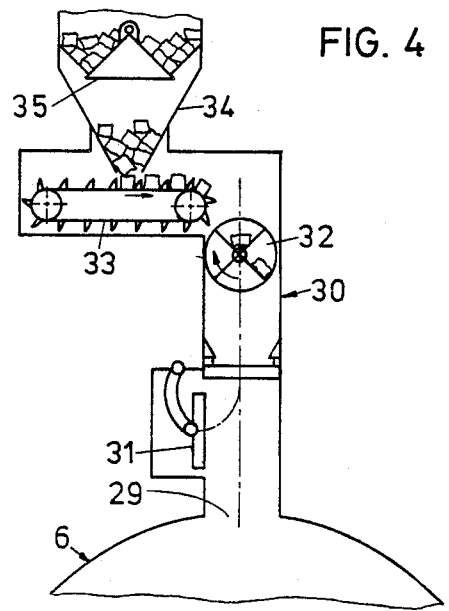

The invention will now be explained in more detail with reference to the accompanying drawings, wherein:

FIGS. 1 to 3 each show an advantageous embodiment of a plant according to the invention in a schematic illustration; and FIG. 4 represents a detail of FIG. 1 on an enlarged scale.

According to FIG. 1, a direct reduction means is designed as a shaft furnace 1, into whose direct reduction zone 2 lumpy iron-oxide containing charging substances 4 are top-charged via a supply duct 3, optionally together with unburnt fluxes introduced via a supply duct 5. The shaft furnace 1 communicates with a meltdown gasifier 6, in which a reduction gas is produced from carbon carriers and oxygen-containing gas, which reduction gas is fed to the shaft furnace 1 via a supply duct 7, a gas purifying and a gas cooling means 8 being disposed in the supply duct 7.

The meltdown gasifier 6 includes a supply duct 9 for solid lumpy carbon carriers, if desired, several supply ducts 10, 11 for oxygen-containing gases, and supply ducts 12, 13 for carbon carriers liquid or gaseous at room temperature, such as hydrocarbons, as well as for burnt fluxes. In the meltdown gasifier 6, molten pig iron 16 and molten slag 17 collect below the meltdown gasifying zone 15 and are separately tapped via their own tap holes 18, 19, respectively.

The lumpy charging substances reduced to sponge iron in the direct reduction zone 2 of the shaft furnace 1 are supplied to the meltdown gasifier 6 via ducts 20, for instance, by means of delivery screws 21. To the upper part of the shaft furnace 1, there is connected a discharge duct 22 for the top gas forming in the direct reduction zone 2. This top gas is fed to gas purifiers 23 and, thereafter, is available for further use via a top gas duct 24.

A gas scrubber 25 is provided to separate heavy metals from the reduction gas, which are formed as fine particles in the meltdown gasifier. The gas scrubbing means 25 is connected with the meltdown gasifier 6 via a reduction gas duct 26. The purified reduction gas can be fed to the meltdown gasifier 6 via a duct 27 or into duct 7 via a discharge duct 28, and further on into the shaft furnace 2, or it may be available for further use via the top gas duct 24.

In the cupola of the meltdown gasifier, a scrap charging opening 29 is provided, through which the portioned scrap may be introduced. As illustrated in detail in FIG. 4, a scrap charging means 30 comprising a sealing flap 31 and a pre-arranged cellular wheel sluice 32, which serves as the portioning means for the scrap and is fed via a plate belt 33, runs into the opening 29. A scrap hopper 34 is gas-tightly placed on the scrap charging means 30 and, in its turn, is provided with a gas-tight closure 35 on its delivery side.

In the process according to the invention, the addition of scrap may be effected both directly into the meltdown gasifier (FIG. 1) and additionally (FIG. 2) or exclusively (FIG. 3) into the shaft furnace, with the scrap charging means of the shaft furnace being designed similar to that illustrated in FIG. 4.

The invention will now be explained in more detail by way of the following examples:

EXAMPLE 1

Introduction of scrap directly into the meltdown gasifier.

As the scrap consumer scrap, as the iron-oxide containing charging substance iron ore, and as the carbon carrier hard coal were used. The compositions of the charging substances were as follows (in % by mass):

| Hard coal: | crude, % | anhydrous, % |
|---|---|---|
| $H_2O$ | 5.60 | |
| Ashes | 5.80 | 6.1 |
| Volatiles | 29.20 | 30.8 |
| $C_{fix}$ | 59.40 | 62.7 |
| Elementary analysis: | anhydrous, % | |
| $C_{tot.}$ | 81.3 | |
| H | 4.8 | |
| N | 1.4 | |
| O | 5.8 | |
| S | 0.5 | |
| Ore: | | |
| Moisture: | 2% | |
| Fe | 65% | |
| CaO | 0.1% | |
| MgO | 0.1% | |
| $Al_2O_3$ | 1.0% | |
| $SiO_2$ | 3.0% | |
| Consumer scrap: | | |
| Fe | 90% | |
| Al | 1–2% | |
| Cu | 0.4% | |
| Sn | 0.2% | |
| Zn | 0.2% | |
| Balance | organic constituents | |

When using 1 ton hard coal of the above composition, 1,760 m³ (normal conditions) reduction gas of the following composition (in % by vol.) were produced in the meltdown gasifier:

| CO | 64% |
|---|---|
| $H_2$ | 30% |
| $CO_2$ | 2% |
| $N_2$ | 4% |

As the ferrous charging substance, an ore/scrap mixture at a ratio of 60:40 was used. Per ton of pig iron produced, 755 kg ore, 110 kg lime, 504 kg scrap and 570 kg coal were consumed. The pig iron had the following composition (in % by mass):

| C | 3.5% |
|---|---|
| Mn | 0.1% |
| Si | 1.0% |
| S | 0.06% |
| P | 0.09% |
| Cu | 0.09% |
| Sn | 0.05% |
| Fe | balance |

In addition, 920 m³ (normal conditions) of top gas were recovered per ton of pig iron, which consisted of 53% CO, 19% $H_2$, 24% $CO_2$ and 4% $N_2$ (in % by vol.). Slag formation: 120 kg/t pig iron.

EXAMPLE 2

Addition of scrap into the shaft furnace.

The same starting substances were used as in Example 1. Even the ore/scrap ratio of 60:40 was maintained. With this process variant, 714 kg ore, 100 kg lime, 476 kg scrap and 500 kg coal per ton of pig iron produced were consumed. The pig iron had the following composition (in % by mass):

| C | 4% |
|---|---|
| Mn | 0.1% |
| Si | 1.0% |
| S | 0.05% |
| P | 0.08% |
| Cu | 0.12% |
| Sn | 0.05% |
| Fe | balance |

In addition, 780 m³ (normal conditions) of top gas were recovered per ton of pig iron, which consisted of 51% CO, 18% $H_2$, 27% $CO_2$ and 4% $N_2$ (in % by vol.). Slag formation: 110 kg/t pig iron.

What we claim is:

1. In a process of recovering molten pig iron or steel pre-products from lumpy iron-oxide containing charging substances by providing a direct reduction zone for reducing said charging substances so as to obtain sponge iron, providing a meltdown gasifying zone for smelting said sponge iron, under supply of carbon carriers and oxygen-containing gas forming a coal fluidized bed, and producing a CO and $H_2$ containing reduction gas to be injected into said direct reduction zone and reacted there so as to form top gas, the improvement comprising:

charging scrap containing organic impurities and/or one or more non-ferrous metallic elements and having an apparent weight amounting to between 300 and 1000 kg/m³ and sponge iron into said meltdown gasifying zone, maintaining a temperature of said coal fluidized bed between about 1,500° to 1,700° C., carbonizing and smelting said scrap in said coal fluidized bed while maintaining reducing conditions in said fluidized bed, and pyrolyzing organic impurities present in said scrap.

2. A process as set forth in claim 1, wherein said scrap has an apparent weight amounting to between 400 and 600 kg/m³.

3. A process as set forth in claim 1, further comprising processing said scrap into lumps prior to charging.

4. A process as set forth in claim 3, further comprising mixing said scrap with combustible refuse materials prior to processing.

5. A process as set forth in claim 1, further comprising introducing said scrap directly into said meltdown gasifying zone without preheating.

6. A process as set forth in claim 1, further comprising preheating said scrap prior to charging into said meltdown gasifying zone.

7. A process as set forth in claim 6, wherein said scrap is preheated by being introduced into said direct reduction zone commonly with said iron-oxide containing charging substance.

8. A process as set forth in claim 1, further comprising removing at least a partial flow of said reduction gas off said meltdown gasifying zone, scrubbing said at least partial flow of said reduction gas, and returning it into at least one of said meltdown gasifying zone and said direct reduction zone.

9. A process as set forth in claim 8, wherein the supply of oxygen-containing gas into said meltdown gasifying zone is discontinuous, and when the supply is stopped, the supply of scrap is increased.

10. In a process of recovering molten pig iron or steel preproducts from lumpy iron-oxide containing charging substances containing tin by providing a direct reduction zone for reducing said charging substances so as to obtain sponge iron, providing a meltdown gasifying zone for smelting said sponge iron under supply of carbon carriers and oxygen-containing gas forming a coal fluidized bed, and producing a CO and $H_2$ containing reduction gas to be injected into said direct reduction zone and reacted there so as to form top gas, the improvement comprising:
 charging scrap containing organic impurities and/or one or more non-ferrous metallic elements and having an apparent weight amounting to between 300 and 1000 kg/m$^3$ and sponge iron into said meltdown gasifying zone,
 maintaining a temperature of said coal fluidized bed between about 1,500° to 1,700° C.,
 carbonizing and smelting said scrap in said coal fluidized bed while maintaining reducing conditions in said fluidized bed,
 pyrolyzing organic impurities present in said scrap, and
 adding metallic calcium to the molten metal.

11. A process as set forth in claim 10, wherein said metallic calcium is dissolved in calcium halide slag.

12. In a process of recovering molten pig iron or steel pre-products from lumpy iron-oxide containing charging substances containing copper by providing a direct reduction zone for reducing said charging substances so as to obtain sponge iron, providing a meltdown gasifying zone for smelting said sponge iron under supply of carbon carriers and oxygen-containing gas forming a coal fluidized bed, and producing a CO and $H_2$ containing reduction gas to be injected into said direct reduction zone and reacted there so as to form top gas, the improvement comprising:
 charging scrap containing organic impurities and/or one or more non-ferrous metallic elements and having an apparent weight amounting to between 300 and 1000 k/m$^3$ and sponge iron into said meltdown gasifying zone,
 maintaining a temperature of said coal fluidized bed between about 1,500° to 1,700° C.,
 carbonizing and smelting said scrap in said coal fluidized bed while maintaining reducing conditions in said fluidized bed,
 pyrolyzing organic impurities present in said scrap, and
 adding a material selected from the group consisting of sodium sulfide slag and sodium sulfate slag to the molten metal.

13. A process as set forth in claim 4, further comprising adding fine lime to said reduction gas.

14. A process as set forth in claim 13, wherein said organic impurities comprise PVC.

* * * * *